United States Patent
Colson et al.

(10) Patent No.: US 10,982,682 B2
(45) Date of Patent: Apr. 20, 2021

(54) FAN ROTOR FOR RAM AIR FAN

(71) Applicant: Hamilton Sundstrand Corporation, Charlotte, NC (US)

(72) Inventors: Darryl A. Colson, West Suffield, CT (US); Roberto J. Perez, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 322 days.

(21) Appl. No.: 15/923,749

(22) Filed: Mar. 16, 2018

(65) Prior Publication Data
US 2019/0285083 A1    Sep. 19, 2019

(51) Int. Cl.
| | |
|---|---|
| F04D 29/32 | (2006.01) |
| B64D 13/08 | (2006.01) |
| F04D 25/06 | (2006.01) |
| F04D 29/38 | (2006.01) |
| F04D 19/00 | (2006.01) |
| B64D 13/06 | (2006.01) |
| F04D 29/056 | (2006.01) |
| F04D 29/58 | (2006.01) |

(52) U.S. Cl.
CPC .......... *F04D 29/329* (2013.01); *B64D 13/06* (2013.01); *B64D 13/08* (2013.01); *F04D 19/00* (2013.01); *F04D 25/06* (2013.01); *F04D 29/384* (2013.01); *B64D 2013/0618* (2013.01); *F04D 29/056* (2013.01); *F04D 29/5806* (2013.01)

(58) Field of Classification Search
None
See application file for complete search history.

(56) References Cited

U.S. PATENT DOCUMENTS

| | | | |
|---|---|---|---|
| 1,940,466 A | 12/1933 | Sneed | |
| 2,527,229 A | 10/1950 | Roubal | |
| 2,752,515 A | 6/1956 | Baudry et al. | |
| 3,410,029 A | 11/1968 | Savage | |
| 3,433,020 A | 3/1969 | Earle, Jr. et al. | |
| 3,588,044 A | 6/1971 | Reichrath | |

(Continued)

FOREIGN PATENT DOCUMENTS

| | | |
|---|---|---|
| CN | 101535658 A | 9/2009 |
| CN | 201786740 U | 4/2011 |

(Continued)

OTHER PUBLICATIONS

Extended European Search Report for European Patent Application No. 19157948.1, dated Aug. 8, 2019.

(Continued)

*Primary Examiner* — David Hamaoui
*Assistant Examiner* — Jason Fountain
(74) *Attorney, Agent, or Firm* — Kinney & Lange, P.A.

(57) ABSTRACT

A fan rotor for a ram air fan includes a hub and blades extending radially outwards from the hub. The hub includes an inner hub portion, a disk portion connected to a radially outer surface of the inner hub portion, and an outer hub portion connected to a radially outer surface of the disk portion. The outer hub portion has an upstream arm with a compound contoured surface. The compound contoured surface is configured to direct air flow around the compound contoured surface and along roots of the blades.

17 Claims, 6 Drawing Sheets

(56) References Cited

U.S. PATENT DOCUMENTS

| | | |
|---|---|---|
| 3,763,835 A | 10/1973 | Miller et al. |
| 3,915,024 A | 10/1975 | Mort |
| 3,949,550 A | 4/1976 | Albrecht et al. |
| 3,999,872 A | 12/1976 | Allison |
| 4,012,154 A | 3/1977 | Durwin et al. |
| 4,439,106 A | 3/1984 | Ferris et al. |
| 4,511,193 A | 4/1985 | Geczy |
| 4,543,785 A | 10/1985 | Patrick |
| 4,583,911 A | 4/1986 | Braun |
| 4,979,872 A | 12/1990 | Myers et al. |
| 5,239,815 A | 8/1993 | Barcza |
| 5,505,587 A | 4/1996 | Ghetzler |
| 5,529,316 A | 6/1996 | Mattila |
| 5,683,184 A | 11/1997 | Striedacher et al. |
| 5,967,745 A | 10/1999 | Tomita et al. |
| 6,299,077 B1 | 10/2001 | Harmon et al. |
| 6,380,647 B2 | 4/2002 | Hayashi et al. |
| 6,698,933 B2 | 3/2004 | Lau |
| 6,926,490 B2 | 8/2005 | McAuliffe et al. |
| 6,928,963 B2 | 8/2005 | Karanik |
| 6,966,174 B2 | 11/2005 | Paul |
| 7,165,939 B2 | 1/2007 | Chen et al. |
| 7,342,332 B2 | 3/2008 | McAuliffe et al. |
| 7,345,386 B2 | 3/2008 | Dano et al. |
| 7,394,175 B2 | 7/2008 | McAuliffe et al. |
| 7,397,145 B2 | 7/2008 | Struve et al. |
| 7,757,502 B2 | 7/2010 | Merritt et al. |
| 7,952,241 B2 | 5/2011 | Kato et al. |
| 8,459,966 B2 | 6/2013 | Hipsky et al. |
| 8,882,454 B2 | 11/2014 | Chrabascz et al. |
| 8,887,486 B2 | 11/2014 | Rosen et al. |
| 8,961,127 B2 | 2/2015 | Colson et al. |
| 9,028,220 B2 | 5/2015 | Colson et al. |
| 9,039,357 B2 | 5/2015 | Lee |
| 9,057,386 B2 | 6/2015 | Binek et al. |
| 9,140,272 B2 | 9/2015 | Binek et al. |
| 9,188,136 B2 * | 11/2015 | Colson .................. F04D 29/329 |
| 9,644,483 B2 | 5/2017 | Subramaniyan et al. |
| 10,370,973 B2 * | 8/2019 | Heikurinen ........... F04D 29/324 |
| 2002/0171218 A1 | 11/2002 | Bell |
| 2005/0116554 A1 | 6/2005 | Dano et al. |
| 2006/0061221 A1 | 3/2006 | McAuliffe et al. |
| 2010/0033041 A1 | 2/2010 | Watanabe et al. |
| 2010/0055383 A1 | 3/2010 | Schalla et al. |
| 2013/0097997 A1 | 4/2013 | Chrabascz et al. |
| 2013/0101402 A1 | 4/2013 | Rosen et al. |
| 2013/0101436 A1 | 4/2013 | Colson et al. |
| 2016/0097284 A1 | 4/2016 | Colson et al. |

FOREIGN PATENT DOCUMENTS

| | | |
|---|---|---|
| DE | 102008042292 A1 | 3/2010 |
| EP | 3187712 A1 | 7/2017 |
| JP | 2007177778 A | 7/2007 |

OTHER PUBLICATIONS

Deng, Xijuan, "Machiner, No. 8", Application of Liquid Nitrogen in Mechanical Manufacturing and Assembling, 2 pages. See p. 7 of Third Chinese Office Action dated Nov. 28, 2016.

Chinese First Office Action for Chinese Application No. 201210409549.7, dated Dec. 1, 2015, 23 pages.

Second Chinese Office Action for Chinese Patent Application No. 201210409549.7, dated Jun. 23, 2016, 25 pages.

Third Chinese Office Action for Chinese Patent Application No. 201210409549.7, dated Nov. 28, 2016, 24 pages.

Fourth Chinese Office Action for Chinese Patent Application No. 201210409549.7, dated Mar. 13, 2017, 24 pages.

Fifth Chinese Office Action for Chinese Patent Application No. 201210409549.7, dated Jul. 10, 2017, 10 pages.

\* cited by examiner

FAN ROTOR FOR RAM AIR FAN

BACKGROUND

The present invention relates to an environmental control system. In particular, the invention relates to a ram air fan assembly for an environmental control system for an aircraft.

An environmental control system (ECS) aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan. As with any system aboard an aircraft, there is great value in an improved ram air fan that includes innovative components designed to improve the operational efficiency of the ram air fan and to reduce its weight.

SUMMARY

An outer hub portion for a fan rotor includes an upstream arm and a downstream arm opposite of the upstream arm. The upstream arm includes a radially inner surface, a radially outer surface opposite of the radially inner surface, and a compound contoured surface connecting the radially inner surface to the radially outer surface.

A fan rotor for a ram air fan includes a hub and blades extending radially outwards from the hub. The hub includes an inner hub portion, a disk portion connected to a radially outer surface of the inner hub portion, and an outer hub portion connected to a radially outer surface of the disk portion. The outer hub portion has an upstream arm with a compound contoured surface. The compound contoured surface is configured to direct air flow around the compound contoured surface and along roots of the blades.

A ram air fan includes a tie rod with a first end and a second end, a motor including a rotor that rotates with the tie rod and a stator positioned radially around the rotor, and a fan rotor attached to a first end of the tie rod that rotates with the tie rod. The fan rotor includes a hub and blades extending radially outwards from the hub. The hub has an inner hub portion, a disk portion connected to a radially outer surface of the inner hub portion, and an outer hub portion connected to a radially outer surface of the disk portion. The outer hub portion has an upstream arm with a radially inner surface, a radially outer surface opposite of the radially inner surface, and a compound contoured surface connecting the radially inner surface to the radially outer surface. The compound contoured surface is configured to direct air flow around the compound contoured surface and along roots of the blades.

DETAILED DESCRIPTION

Figure 1:
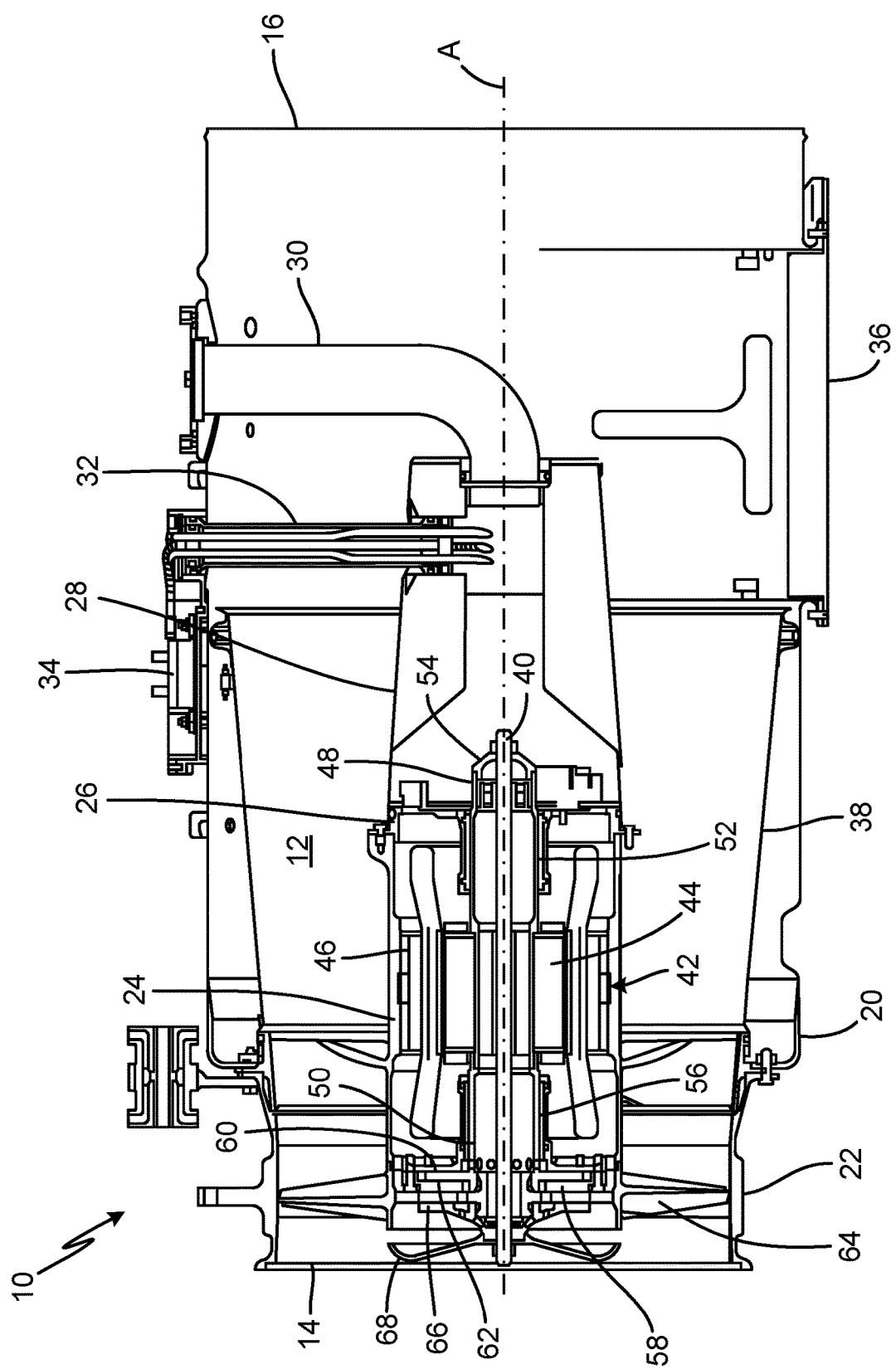
FIG. 1 is cross-sectional view of a ram air fan.

FIG. 1 is a cross-sectional view of ram air fan 10. Ram air fan 10 includes ram air flow path 12, ram air inlet 14, and ram air outlet 16. Ram air fan 10 further includes outer housing 20, inlet housing 22, fan housing 24, bearing housing 26, inner housing 28, motor bearing cooling tube 30, wire transfer tube 32, terminal box 34, check valve 36, diffuser 38, tie rod 40, motor 42, motor rotor 44, motor stator 46, journal bearing shaft 48, thrust shaft 50, first journal bearing 52, shaft cap 54, second journal bearing 56, thrust plate 58, first thrust bearing 60, second thrust bearing 62, fan rotor 64, hub 66, and inlet shroud 68. Axis A extends along a central axis ram air fan 10.

Ram air fan 10 includes ram air flow path 12 that extends between ram air inlet 14 and ram air outlet 16. Outer housing 20 and inlet housing 22 are attached form a housing of ram air fan 10. Ram air inlet 14 is positioned at an upstream end of inlet housing 22, and ram air outlet 16 is positioned at a downstream end of outer housing 20. Fan housing 24, bearing housing 26, and inner housing 28 are held within outer housing 20 and inlet housing 22. Fan housing 24 has fan struts that are bolted between outer housing 20 and inlet housing 22 to attach fan housing 24 to outer housing 20 and inlet housing 22. An upstream end of bearing housing 26 is bolted to a downstream end of fan housing 24. An upstream end of inner housing 28 is attached to a downstream end of bearing housing 26.

Motor bearing cooling tube 30 is connected to and extends between inner housing 28 and outer housing 20. Motor bearing cooling tube 30 provides a source of cooling air to ram air fan 10. Wire transfer tube 32 is connected to and extends between inner housing 28 and outer housing 20. Terminal box 34 is positioned on an outer surface of outer housing 20. Wire transfer tube 32 is connected to terminal box 34. Check valve 36 is positioned in outer housing 20. Diffuser 38 is attached to an inner surface of outer housing 18.

Tie rod 40 extends through fan housing 24, bearing housing 26, and inner housing 28. Tie rod 40 is centered on axis A. Motor 42 is positioned around tie rod 40. Motor 42 includes motor rotor 44 and motor stator 46 positioned radially outwards from motor rotor 44. Motor rotor 44 rotates with tie rod 40. Motor stator 46 is a static component that is attached to fan housing 24.

Journal bearing shaft 48 is attached to a downstream end of motor rotor 44. Thrust shaft 50 is attached to an upstream end of motor rotor 44. Journal bearing shaft 48, motor rotor 44, and thrust shaft 50 define an axis of rotation for ram air fan 10. First journal bearing 52 is positioned on a downstream end of motor 42 between journal bearing shaft 48 and bearing housing 26. Shaft cap 54 is positioned on a downstream end of journal bearing shaft 48. Shaft cap 54 is secured to journal bearing shaft 48 with nuts.

Second journal bearing 56 is positioned on an upstream end of motor 42 between thrust shaft 50 and fan housing 24. Thrust plate 58 is a static component that is bolted to fan housing 24. Thrust plate 58 is positioned on an upstream end of a flange portion of thrust shaft 50. First thrust bearing 60 is positioned between the flange portion of thrust shaft 50 and fan housing 24. Second thrust bearing 62 is positioned between flange portion of thrust shaft 50 and thrust plate 58. Fan rotor 64 is positioned around tie rod 40 on an upstream end of thrust plate 58. Hub 66 is positioned on an upstream end of fan rotor 64, and inlet shroud 68 is positioned on an upstream end of hub 66. Hub 66 and inlet shroud 68 are secured to fan rotor 64 with nuts. Fan rotor 64, hub 66, inlet shroud 68, and a portion of fan housing 24 are contained within inlet housing 22.

In operation, ram air fan 10 is installed into an environmental control system (ECS) aboard an aircraft. When the aircraft does not move fast enough to generate sufficient ram air pressure to meet the cooling needs of the ECS, power is supplied to motor 42 by wires running from terminal box 34, through wire transfer tube 32, inner housing 28, and bearing housing 26. The power energizes motor stator 44, which causes rotor 42 to rotate about axis A of ram air fan 10. This in turn rotates journal bearing shaft 48 and thrust shaft 50, which are connected to motor rotor 44. Fan rotor 64, hub 66, and inlet shroud 68 also rotate by way of their connection to thrust shaft 50. First journal bearing 52, second journal bearing 56, first thrust bearing 60, and second thrust bearing 62 provide low friction support for the rotating components. As fan rotor 64 rotates, it moves air from ram air inlet 14 into ram air flow path 12, which includes moving the air through inlet housing 22, past the fan struts of fan housing 24, and into the space between fan housing 24 and outer housing 20. This increases the air pressure in outer housing 20. As the air moves through ram air flow path 12, it flows across diffuser 38 and inner housing 28, where the static pressure increases due to the shape of diffuser 38 and the shape of inner housing 28. Once the air flows across inner housing 28, it moves out of outer housing 20 at ram air outlet 16.

Components within bearing housing 26 and fan housing 24, especially motor 42, first journal bearing 52, second journal bearing 56, first thrust bearing 60, and second thrust bearing 62, generate significant heat and must be cooled. Cooling air is provided by motor bearing cooling tube 30 which directs a flow of cooling air to inner housing 28. Inner housing 28 directs the flow of cooling air to bearing housing 26, where it flows past components in bearing housing 26 and fan housing 24 to cool motor 42, first journal bearing 52, second journal bearing 56, first thrust bearing 60, and second thrust bearing 62. The cooling air then exits fan housing 24 through cooling holes in fan rotor 64 and hub 66. The cooling air is directed upwards into ram air flow path 12 between hub 66 and inlet shroud 68.

Figure 2A:
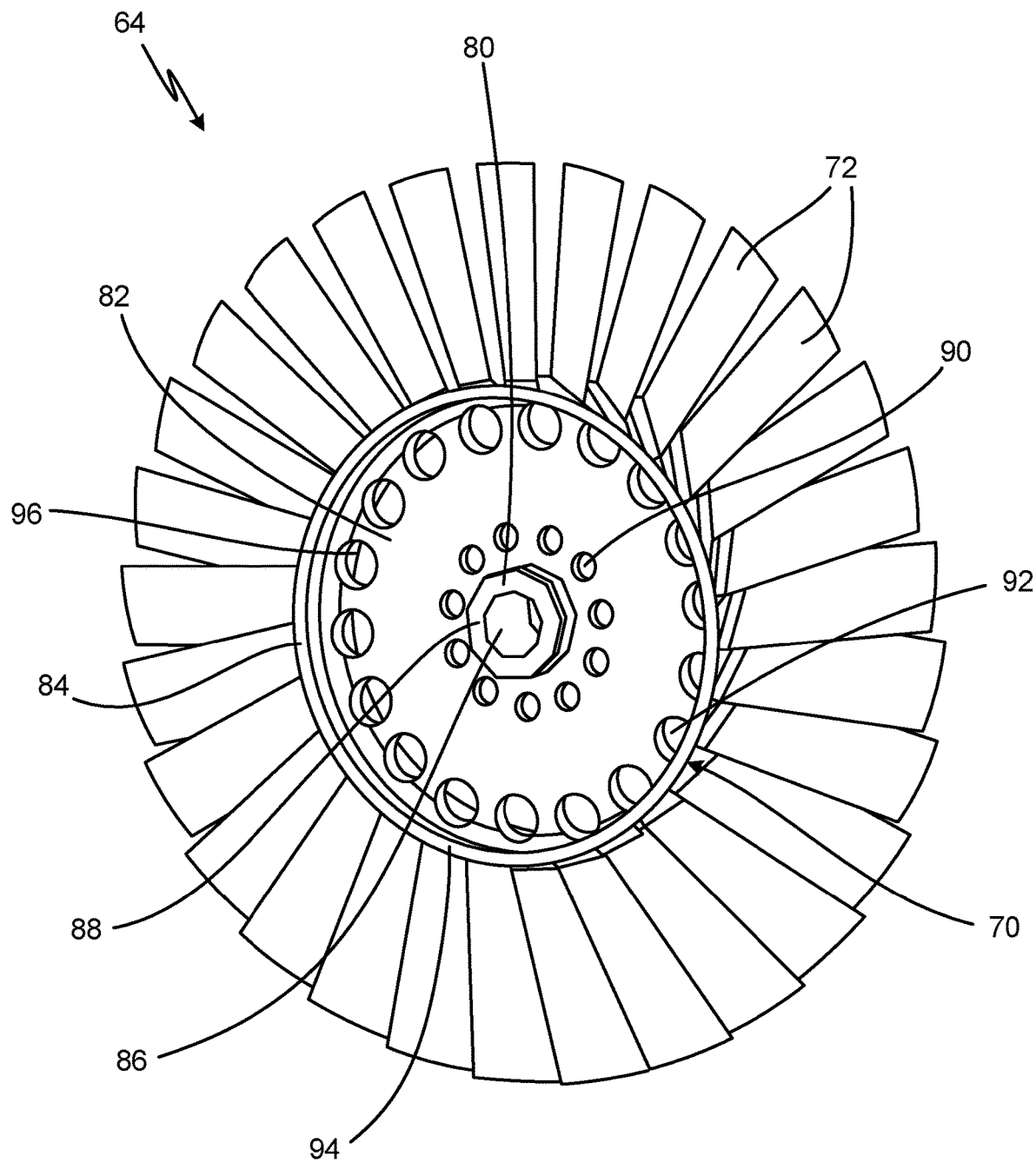
FIG. 2A is a perspective view of a fan rotor.
Figure 2B:
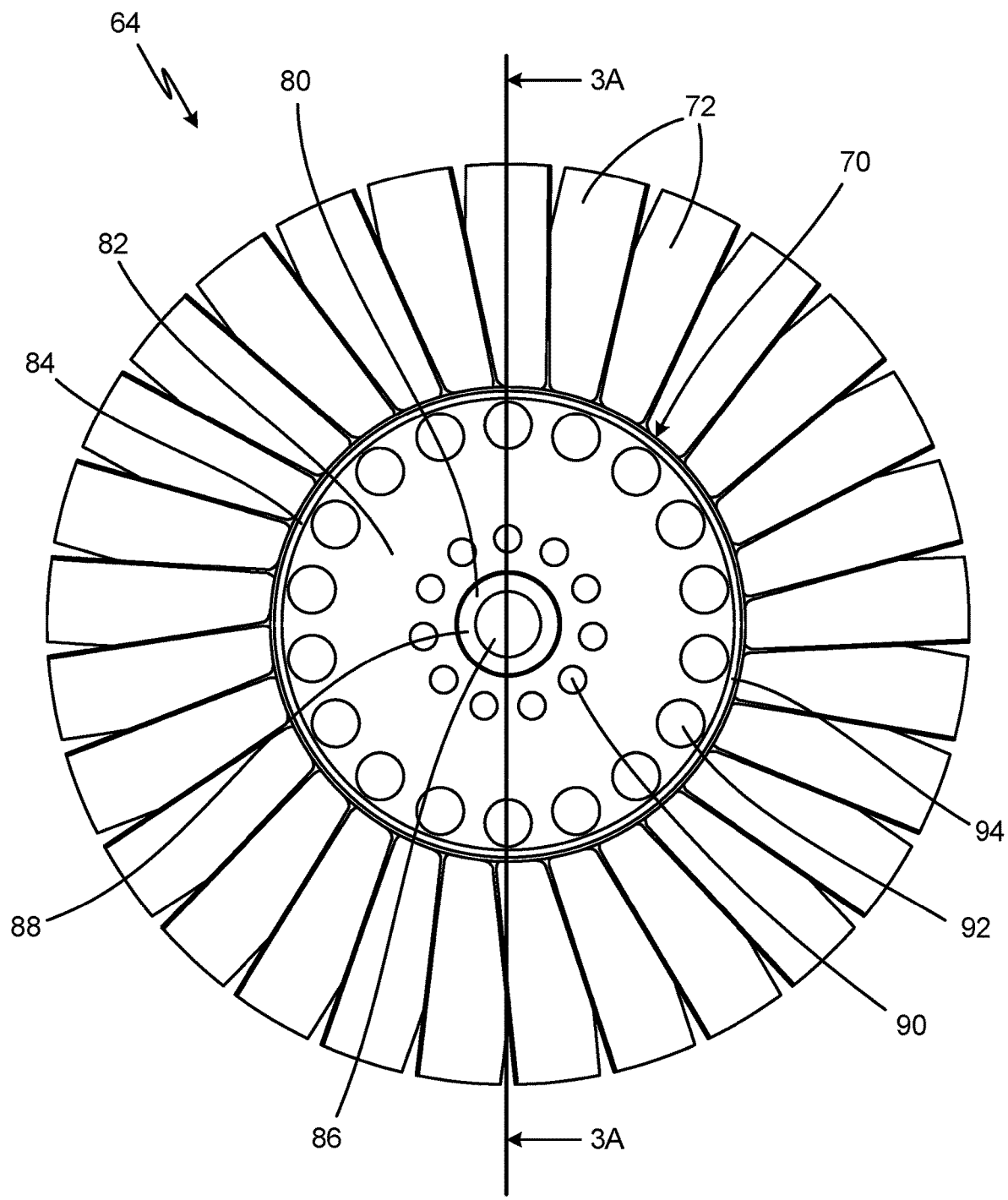
FIG. 2B is a front view of the fan rotor.

FIG. 2A is a perspective view of fan rotor 64. FIG. 2B is a front view of fan rotor 64. Fan rotor 64 includes hub 70 and blades 72. Hub 70 includes inner hub portion 80, disk portion 82, and outer hub portion 84. Inner hub portion 80 includes bore 86 and pilots 88. Disk portion 82 includes first cooling holes 90 and second cooling holes 92. Outer hub portion 82 includes upstream arm 94 and downstream arm 96 (shown in FIG. 2A).

Fan rotor 64 is made out of aluminum in the embodiment shown. Fan rotor 64 includes hub 70 and blades 72 that form a body of fan rotor 64. Blades 72 extend radially outwards from a radially outer surface of hub 70. Hub 70 includes inner hub portion 80, disk portion 82 connected to a radially outer surface of inner hub portion 80, and outer hub portion 84 connected to a radially outer surface of disk portion 82.

Inner hub portion 80 is a ring-shaped part. Bore 86 extends through inner hub portion 80. Bore 86 is sized to receive tie rod 40 of ram air fan 10 (shown in FIG. 1). Inner hub portion 80 also includes pilots 88. Pilots 88 are an axially upstream face and an axially downstream face of inner hub portion 80. Pilots 88 abut other components to mate fan rotor 64 with the other components. Pilot 88 on the axially upstream face of inner hub portion 80 mates with hub 66 (shown in FIG. 1), and pilot 88 on the axially downstream face of inner hub portion 80 mates with thrust shaft 50 (shown in FIG. 1).

Disk portion 82 is a flat plate. First cooling holes 90 and second cooling holes 92 are openings that extend through disk portion 82. First cooling holes 90 are positioned radially inward on disk portion 82 adjacent to inner hub portion 80. Second cooling holes 92 are positioned radially outward on disk portion 82 adjacent to outer hub portion 84. First cooling holes 90 are radially inward from second cooling holes 92.

Outer hub portion 84 is a ring-shaped part. Outer hub portion 84 has upstream arm 94 and downstream arm 96. Upstream arm 94 extends axially upstream from a center of fan rotor 64, and downstream arm 96 extends axially downstream from a center of rotor 64. Upstream arm 94 is axially upstream of downstream arm 96.

Fan rotor 64 is mounted in ram air fan 10 (shown in FIG. 1). Fan rotor 64 pulls air into and moves air through ram air fan 10. Fan rotor 64 rotates with the rotating components in ram air fan 10 on tie shaft 40 (shown in FIG. 1). Cooling air flows along a central axis of ram air fan 10 to cool motor 42, first journal bearing 52, second journal bearing 56, first thrust bearing 60, and second thrust bearing 62. First cooling holes 90 and second cooling holes 92 allow the cooling air to flow through disk portion 82 of fan rotor 64. The cooling air is then directed upwards into ram air flow path 12 (shown in FIG. 1) of ram air fan 10.

Figure 3A:
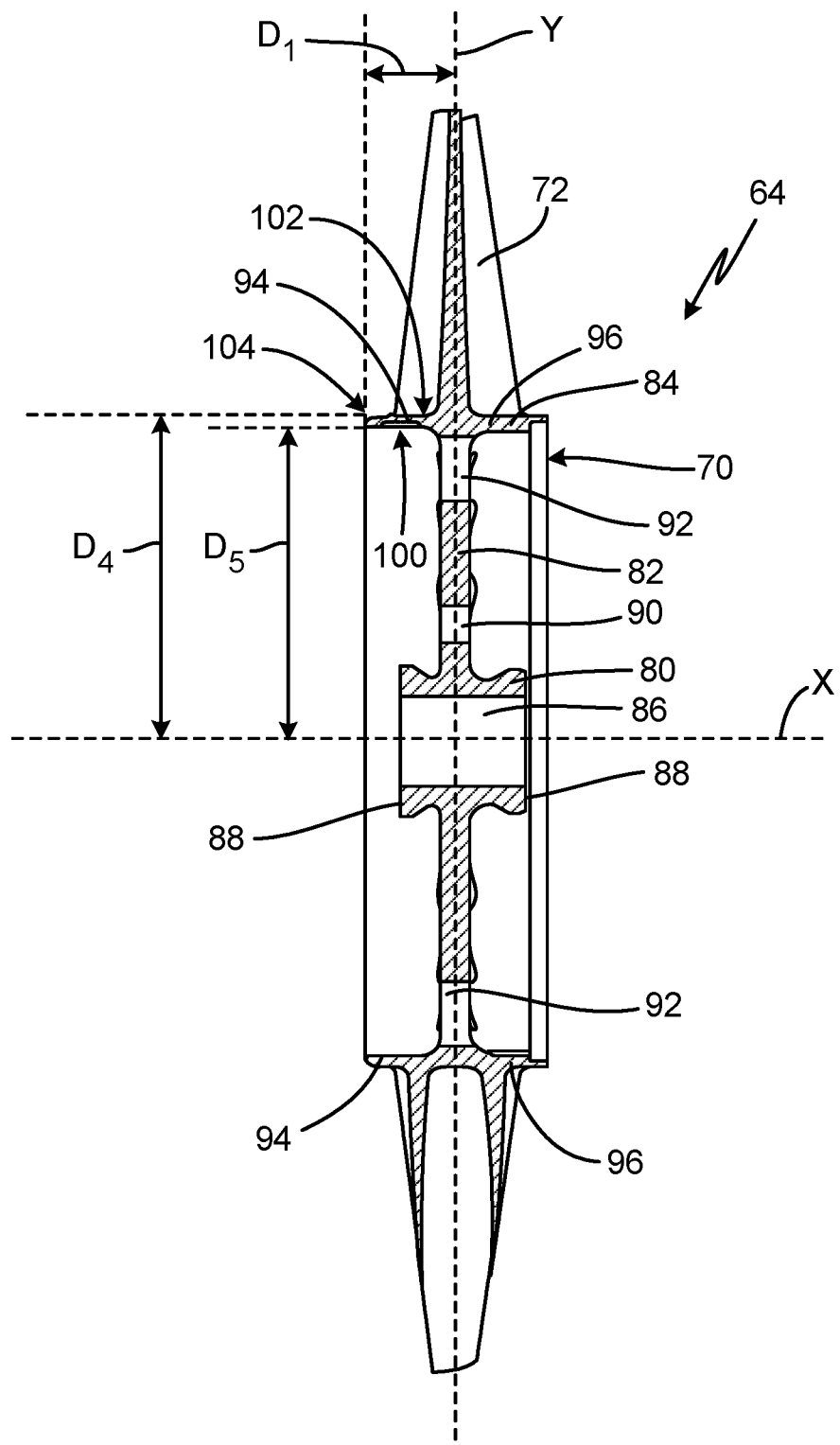
FIG. 3A is a cross-sectional view of the fan rotor taken along line 3A-3A of FIG. 2B.
Figure 3B:
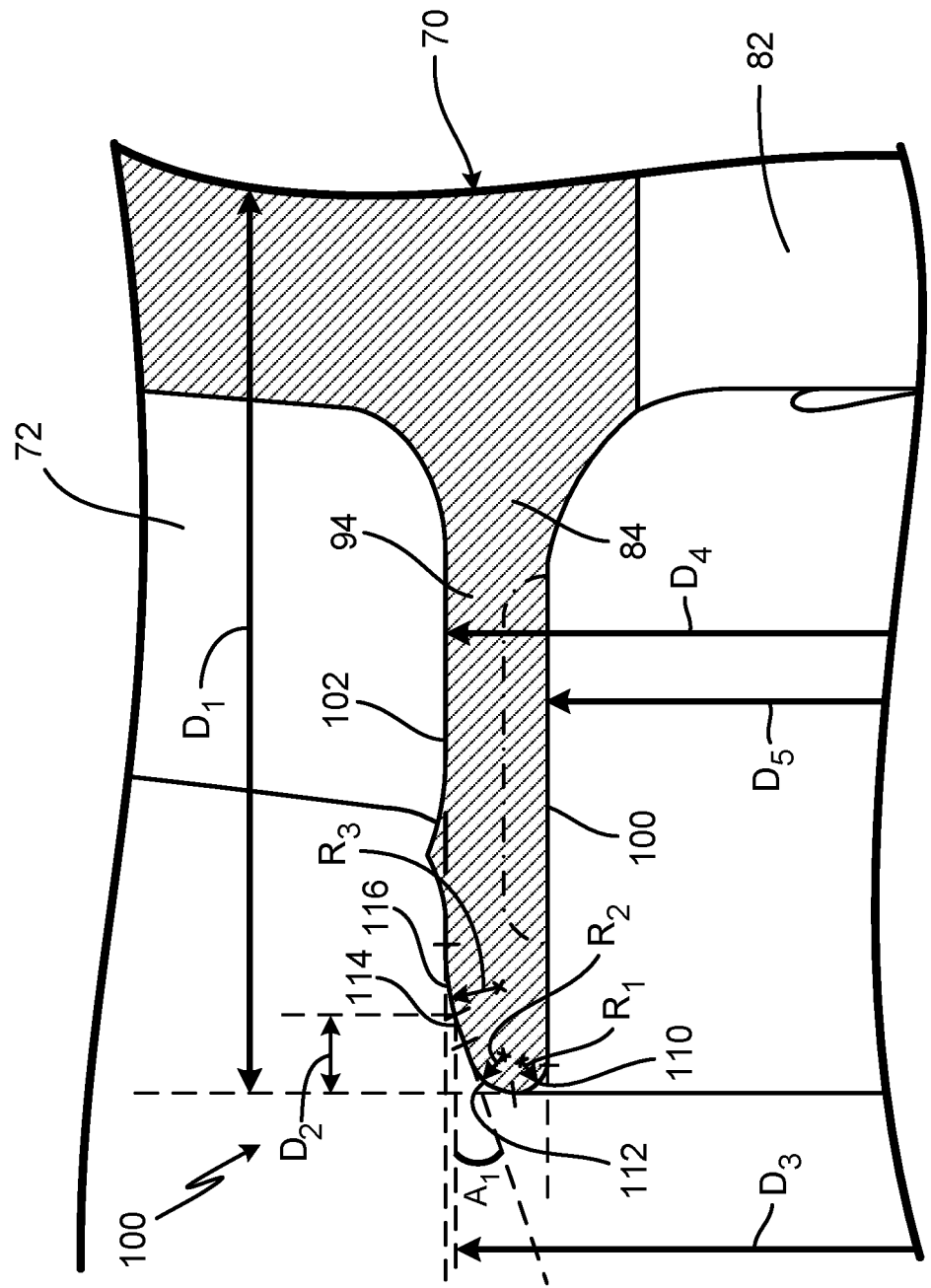
FIG. 3B is an enlarged cross-sectional view of an upstream arm of an outer hub portion of the fan rotor.

FIG. 3A is a cross-sectional view of fan rotor 64 taken along line 3A-3A of FIG. 2B. FIG. 3B is an enlarged cross-sectional view of upstream arm 94 of outer hub portion 84 of fan rotor 64. Fan rotor 64 includes hub 70 and blades 72. Hub 70 includes inner hub portion 80 (shown in FIG. 3A), disk portion 82, and outer hub portion 84. Inner hub portion 80 includes bore 86 (shown in FIG. 3A) and pilots 88 (shown in FIG. 3A). Disk portion 82 includes first cooling holes 90 (shown in FIG. 3A) and second cooling holes 92 (shown in FIG. 3A). Outer hub portion 84 includes upstream arm 94 and downstream arm 96 (shown in FIG. 3A). Upstream arm 94 has radially inner surface 100, radially outer surface 102, and compound contoured surface 104. Compound contoured surface 104 includes first arcuate segment 110 (shown in FIG. 3B), second arcuate segment 112 (shown in FIG. 3B), chamfered segment 114 (shown in FIG. 3B), and third arcuate segment 116 (shown in FIG. 3B). FIG. 3A shows axis X and axis Y. FIGS. 3A-3B show distance $D_1$, distance $D_4$, and distance $D_5$. FIG. 3B shows distance $D_2$, distance $D_3$, first radius $R_1$, second radius $R_2$, third radius $R_3$, and angle $A_1$.

Fan rotor 64 has the structure as described above in FIGS. 2A-2B. Fan rotor 64 has axis X extending axially along a center of fan rotor 64 and axis Y extending radially along a center of fan rotor 64. Hub 70 and blades 72 of fan rotor 64 are centered on axis X and axis Y. Blades 72 extend radially outwards from a radially outer surface of hub 70. Hub 70 includes inner hub portion 80, disk portion 82 connected to a radially outer surface of inner hub portion 80, and outer hub portion 84 connected to a radially outer surface of disk portion 82.

Inner hub portion 80 includes bore 86 extending through inner hub portion 80 and pilots 88 on an axially upstream face and an axially downstream face of inner hub portion 80. Disk portion 82 includes first cooling holes 90 and second cooling holes 92 extending through disk portion 82. Outer hub portion 84 has upstream arm 94 and downstream arm 96.

Upstream arm 94 has radially inner surface 100 and radially outer surface 102 opposite of radially inner surface 100. Upstream arm 94 further includes compound contoured surface 104 on a leading edge of upstream arm 94 that connects radially inner surface 100 to radially outer surface 102.

Compound contoured surface 104 includes first arcuate segment 110, second arcuate segment 112, chamfered segment 114, and third arcuate segment 116. First arcuate segment 110 extends from radially inner surface 100 of upstream arm 94 to second arcuate segment 112. First arcuate segment 110 has first radius $R_1$ that is between 0.025 inches (0.0635 centimeters) and 0.035 inches (0.0889 centimeters). Second arcuate segment 112 extends from first arcuate segment 110 to chamfered segment 114. Second arcuate segment 112 has second radius $R_2$ that is between 0.045 inches (0.1143 centimeters) and 0.055 inches (0.1397 centimeters). Chamfered segment 114 extends from second arcuate segment 112 to third arcuate segment 116. Chamfered segment 114 has angle A1 that is between 19.5 degrees and 20.5 degrees. Third arcuate segment 116 extends from chamfered segment 114 to radially outer surface 102 of upstream arm 94. Third arcuate segment 116 has third radius $R_3$ that is between 0.195 inches (0.4953 centimeters) and 0.205 inches (0.5207 centimeters).

Compound contoured surface 104 has a forward-most point that is distance $D_1$ away from axis Y. Distance $D_1$ is between 1.055 inches (2.6797 centimeters) and 1.065 inches (2.7051 centimeters). Chamfered segment 114 has a first end at distance $D_2$ from the forward-most point of compound contoured surface 104 and at distance $D_3$ from axis X. Distance $D_2$ is between 0.05 inches (0.1270 centimeters) and 0.06 inches (0.1524 centimeters). Distance $D_3$ is between 3.275 inches (8.3185 centimeters) and 3.285 inches (8.3439 centimeters). Radially outer surface 102 of upstream arm 94 is distance $D_4$ away from axis X. Distance $D_4$ is between 3.295 inches (8.3693 centimeters) and 3.305 inches (8.3947 centimeters). Radially inner surface 100 of upstream arm 94 is distance $D_5$ away from axis X. Distance $D_5$ is between 3.185 inches (8.0899 centimeters) and 3.195 inches (8.1153 centimeters).

Third radius $R_3$ is larger than second radius $R_2$, and second radius $R_2$ is larger than first radius $R_1$. A ratio of first radius $R_1$ of first arcuate segment 110 to second radius $R_2$ of second arcuate section 112 is between 0.4545 and 0.7778. A ratio of first radius $R_1$ of first arcuate segment 110 to third radius $R_3$ of third arcuate segment 116 is between 0.1220 and 0.1795. A ratio of second radius $R_2$ of second arcuate segment 112 to third radius $R_3$ of third arcuate segment 116 is between 0.2195 and 0.2821. A ratio of distance $D_3$ to distance $D_4$ is between 0.9909 and 0.9970. A ratio of distance $D_2$ to distance $D_1$ is between 0.0470 and 0.0569.

The combination of first arcuate segment 110, second arcuate segment 112, chamfered segment 114, and third arcuate segment 116 together form compound contoured surface 104 of upstream arm 94 to improve the flow of cooling air through ram air fan 10 (shown in FIG. 1). Compound contoured surface 104 directs cooling air flowing through first cooling holes 90 and second cooling holes 92 of disk portion 82 around compound contoured surface 104 of upstream arm 94 and along roots of blades 72 of fan rotor 64.

Figure 4:
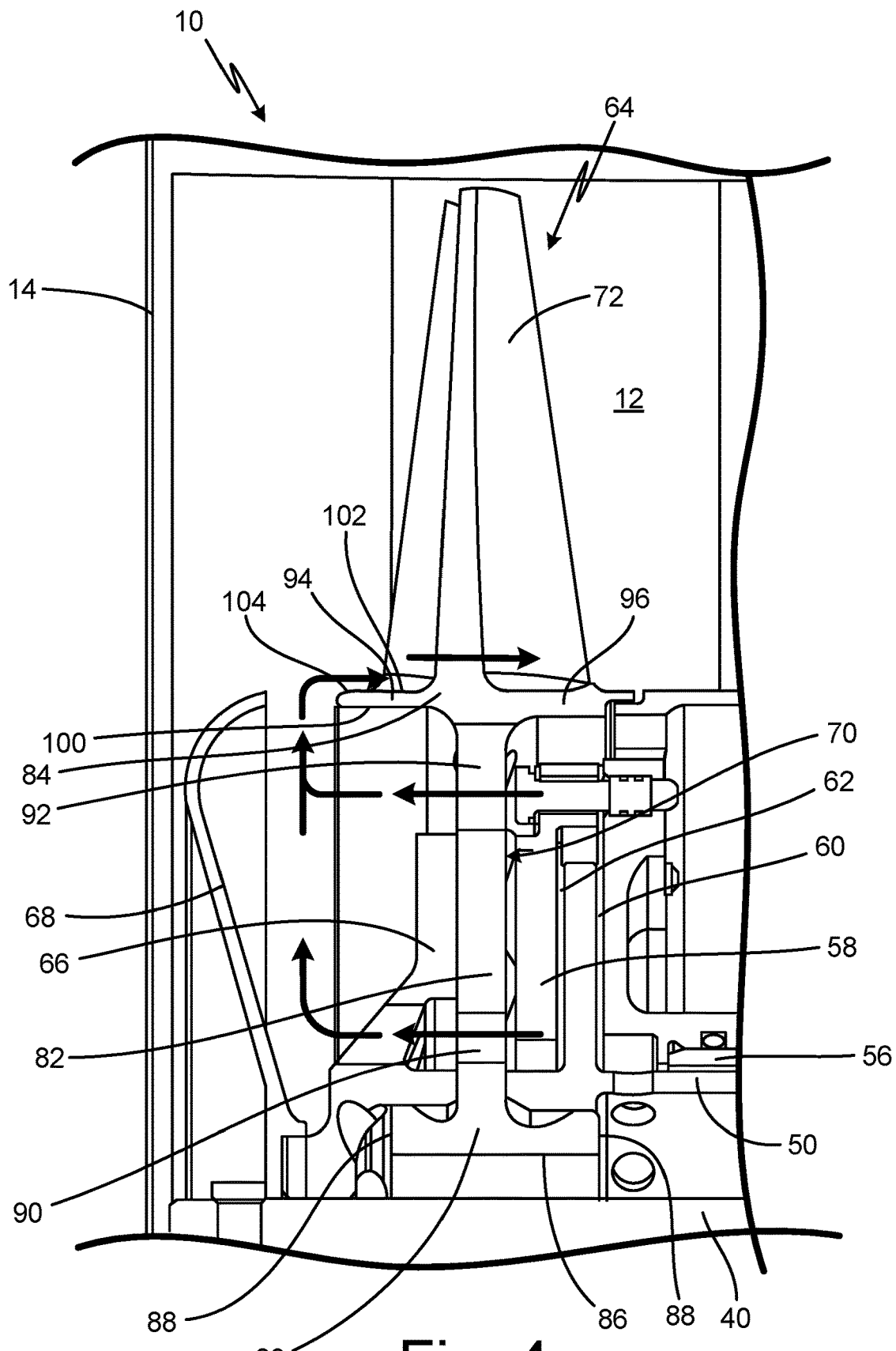
FIG. 4 is a cross-sectional view of the fan rotor positioned in the ram air fan.

FIG. 4 is a cross-sectional view of fan rotor 64 positioned in ram air fan 10. Ram air fan 10 includes ram air flow path 12 and ram air inlet 14. Ram air fan 10 further includes tie rod 40, thrust shaft 50, second journal bearing 56, thrust plate 58, first thrust bearing 60, second thrust bearing 62, fan rotor 64, hub 66, and inlet shroud 68. Fan rotor 64 includes hub 70 and blades 72. Hub 70 includes inner hub portion 80, disk portion 82, and outer hub portion 84. Inner hub portion 80 includes bore 86 and pilots 88. Disk portion 82 includes first cooling holes 90 and second cooling holes 92. Outer hub portion 84 includes upstream arm 94 and downstream arm 96. Upstream arm 94 has radially inner surface 100, radially outer surface 102, and compound contoured surface 104.

Ram air fan 10 is described in reference to FIG. 1. Fan rotor 64 is described in reference to FIGS. 2A-3B. Fan rotor 64 has compound contoured surface 104 on a leading edge of upstream arm 94 of outer hub portion 84. Cooling air flows through a center of ram air fan 10 to cool motor 42 (shown in FIG. 1), first journal bearing 52 (shown in FIG. 1), second journal bearing 56, first thrust bearing 60, and second thrust bearing 62. As shown with the arrows in FIG. 4, the cooling air flows through first cooling holes 90 and second cooling holes 92 of fan rotor 64 and is directed upwards towards ram air flow path 12 with inlet shroud 68.

Prior art fan rotors had a squared leading edge on the upstream arm of the outer hub portion. This directed the air flow up into the ram air flow path 12 and created disturbances in the flow along the roots of the blades of the fan rotor. This degraded the performance of ram air fan 10.

Fan rotor 64 has compound contoured surface 104 on the leading edge of upstream arm 94 of outer hub portion 84. Compound contoured surface 104 directs the cooling air flowing through first cooling holes 90 and second cooling holes 92 of fan rotor 64 along the roots of blades 72 of fan rotor 64, as shown with the arrows in FIG. 4. As the air stays close to the roots of blades 72 of fan rotor 64, there are fewer to no disturbances in the air flow. This allows fan rotor 64 to increase how much work it is doing, which increases the performance of ram air fan 10. Compound contoured surface 104 improves overall ram air fan 10 performance by directing the cooling air flow along the roots of blades 72 of ram air fan 64.

DISCUSSION OF POSSIBLE EMBODIMENTS

The following are non-exclusive descriptions of possible embodiments of the present invention.

An outer hub portion for a fan rotor includes an upstream arm and a downstream arm opposite of the upstream arm. The upstream arm includes a radially inner surface, a radially outer surface opposite of the radially inner surface, and a compound contoured surface connecting the radially inner surface to the radially outer surface.

The outer hub portion of the preceding paragraph can optionally include, additionally and/or alternatively, any one or more of the following features, configurations and/or additional components:

The compound contoured surface includes a first arcuate segment extends from the radially inner surface of the upstream arm and has a first radius $R_1$, a second arcuate segment extends from the first arcuate segment and has a second radius $R_2$, a chamfered segment extends from the second arcuate segment and has an angle $A_1$, and a third arcuate segment extends from the chamfered segment to the radially outer surface and has a third radius $R_3$.

The third radius $R_3$ is larger than the second radius $R_2$.

The second radius $R_2$ is larger than the third radius $R_1$.

A ratio of the first radius $R_1$ to the second radius $R_2$ is between 0.4545 and 0.7778.

A ratio of the first radius $R_1$ to the third radius $R_3$ is between 0.1220 and 0.1795.

A ratio of the second radius $R_2$ to the third radius $R_3$ is between 0.2195 and 0.2821.

The first radius $R_1$ of the first arcuate segment is between 0.025 inches (0.0635 centimeters) and 0.035 inches (0.0889 centimeters).

The second radius $R_2$ of the second arcuate segment is between 0.045 inches (0.1143 centimeters) and 0.055 inches (0.1397 centimeters).

The third radius $R_3$ of the third arcuate segment is between 0.195 inches (0.4953 centimeters) and 0.205 inches (0.5207 centimeters).

The angle $A_1$ of the chamfered section is between 19.5 degrees and 20.5 degrees.

A fan rotor for a ram air fan includes a hub and blades extending radially outwards from the hub. The hub includes an inner hub portion, a disk portion connected to a radially outer surface of the inner hub portion, and an outer hub portion connected to a radially outer surface of the disk portion. The outer hub portion has an upstream arm with a compound contoured surface. The compound contoured surface is configured to direct air flow around the compound contoured surface and along roots of the blades.

The fan rotor of the preceding paragraph can optionally include, additionally and/or alternatively, any one or more of the following features, configurations and/or additional components:

The upstream arm further includes a radially inner surface and a radially outer surface opposite of the radially inner surface, wherein the compound contoured surface connects the radially inner surface to the radially outer surface.

The compound contoured surface includes a first arcuate segment extends from the radially inner surface of the upstream arm and has a first radius $R_1$, a second arcuate segment extends from the first arcuate segment and has a second radius $R_2$, a chamfered segment extends from the second arcuate segment and has an angle $A_1$, and a third arcuate segment extends from the chamfered segment to the radially outer surface and has a third radius $R_3$.

A ratio of the first radius $R_1$ to the second radius $R_2$ is between 0.4545 and 0.7778.

A ratio of the first radius $R_1$ to the third radius $R_3$ is between 0.1220 and 0.1795.

A ratio of the second radius $R_2$ to the third radius $R_3$ is between 0.2195 and 0.2821.

The first radius $R_1$ of the first arcuate segment is between 0.025 inches (0.0635 centimeters) and 0.035 inches (0.0889 centimeters).

The second radius $R_2$ of the second arcuate segment is between 0.045 inches (0.1143 centimeters) and 0.055 inches (0.1397 centimeters).

The third radius $R_3$ of the third arcuate segment is between 0.195 inches (0.4953 centimeters) and 0.205 inches (0.5207 centimeters).

The angle $A_1$ of the chamfered section is between 19.5 degrees and 20.5 degrees.

A forward-most point of the compound contoured surface is distance $D_1$ away from a central axis, and the chamfered section has a first end at a distance $D_2$ from the forward-most point of the compound contoured surface, wherein a ratio of $D_2$ to $D_a$ is between 0.0470 and 0.0569.

The chamfered section has a first end at a distance $D_3$ from the central axis, and the radially outer surface of the upstream arm is distance $D_4$ away from a central axis, wherein a ratio of distance $D_3$ to distance $D_4$ is between 0.9909 and 0.9970.

A ram air fan includes a tie rod with a first end and a second end, a motor including a rotor that rotates with the tie rod and a stator positioned radially around the rotor, and a fan rotor attached to a first end of the tie rod that rotates with the tie rod. The fan rotor includes a hub and blades extending radially outwards from the hub. The hub has an inner hub portion, a disk portion connected to a radially outer surface of the inner hub portion, and an outer hub portion connected to a radially outer surface of the disk portion. The outer hub portion has an upstream arm with a radially inner surface, a radially outer surface opposite of the radially inner surface, and a compound contoured surface connecting the radially inner surface to the radially outer surface. The compound contoured surface is configured to direct air flow around the compound contoured surface and along roots of the blades.

The ram air fan of the preceding paragraph can optionally include, additionally and/or alternatively, any one or more of the following features, configurations and/or additional components:

The compound contoured surface includes a first arcuate segment extends from the radially inner surface of the upstream arm and has a first radius $R_1$, a second arcuate segment extends from the first arcuate segment and has a second radius $R_2$, a chamfered segment extends from the second arcuate segment and has an angle $A_1$, and a third arcuate segment extends from the chamfered segment to the radially outer surface and has a third radius $R_3$.

A ratio of the first radius $R_1$ to the second radius $R_2$ is between 0.4545 and 0.7778.

A ratio of the first radius $R_1$ to the third radius $R_3$ is between 0.1220 and 0.1795.

A ratio of the second radius $R_2$ to the third radius $R_3$ is between 0.2195 and 0.2821.

The first radius $R_1$ of the first arcuate segment is between 0.025 inches (0.0635 centimeters) and 0.035 inches (0.0889 centimeters).

The second radius $R_2$ of the second arcuate segment is between 0.045 inches (0.1143 centimeters) and 0.055 inches (0.1397 centimeters).

The third radius $R_3$ of the third arcuate segment is between 0.195 inches (0.4953 centimeters) and 0.205 inches (0.5207 centimeters).

The angle $A_1$ of the chamfered section is between 19.5 degrees and 20.5 degrees.

The ram air fan further includes a journal bearing shaft positioned radially around the second end of the tie rod; a bearing housing adjacent the second end of the tie rod and positioned around part of the journal bearing shaft; a first journal bearing positioned between the journal bearing shaft and the bearing housing; a thrust shaft positioned radially around the first end of the tie rod; a fan housing adjacent the first end of the tie rod and positioned around part of the thrust shaft; a second journal bearing positioned between the fan housing and the thrust shaft; a hub positioned radially around the first end of the tie rod; and an inlet shroud positioned radially around the first end of the tie rod.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An outer hub portion for a fan rotor, the outer hub portion comprising:
an upstream arm with a radially inner surface, a radially outer surface opposite of the radially inner surface, and a compound contoured surface connecting the radially inner surface to the radially outer surface, wherein the compound contoured surface comprises:
a first arcuate segment extends from the radially inner surface of the upstream arm and has a first radius $R_1$;
a second arcuate segment extends from the first arcuate segment and has a second radius $R_2$;
a chamfered segment extends from the second arcuate segment and has an angle $A_1$; and
a third arcuate segment extends from the chamfered segment to the radially outer surface and has a third radius $R_3$;
wherein a ratio of the first radius $R_1$ to the third radius $R_3$ is between 0.1220 and 0.1795; and
a downstream arm opposite of the upstream arm.

2. The outer hub portion of claim 1, wherein the third radius $R_3$ is larger than the second radius $R_2$, and wherein the second radius $R_2$ is larger than the first radius $R_1$.

3. The outer hub portion of claim 1, wherein:
a ratio of the first radius $R_1$ to the second radius $R_2$ is between 0.4545 and 0.7778; and
a ratio of the second radius $R_2$ to the third radius $R_3$ is between 0.2195 and 0.2821.

4. The outer hub portion of claim 1, wherein:
the first radius $R_1$ of the first arcuate segment is between 0.025 inches (0.0635 centimeters) and 0.035 inches (0.0889 centimeters);
the second radius $R_2$ of the second arcuate segment is between 0.045 inches (0.1143 centimeters) and 0.055 inches (0.1397 centimeters); and
the third radius $R_3$ of the third arcuate segment is between 0.195 inches (0.4953 centimeters) and 0.205 inches (0.5207 centimeters).

5. The outer hub portion of claim 1, wherein the angle $A_1$ of the chamfered section is between 19.5 degrees and 20.5 degrees.

6. A fan rotor for a ram air fan, the fan rotor comprising:
a hub that comprises:
an inner hub portion;
a disk portion connected to a radially outer surface of the inner hub portion; and
an outer hub portion connected to a radially outer surface of the disk portion, the outer hub portion having an upstream arm with a compound contoured surface and a downstream arm opposite of the upstream arm, wherein the upstream arm further includes a radially inner surface and a radially outer surface opposite of the radially inner surface, wherein the compound contoured surface connects the radially inner surface to the radially outer surface and comprises:
a first arcuate segment that extends from the radially inner surface of the upstream arm and has a first radius $R_1$; and
a second arcuate segment that extends from the first arcuate segment and has a second radius $R_2$;
wherein a ratio of the first radius $R_1$ to the second radius $R_2$ is between 0.4545 and 0.7778; and
blades extending radially outwards from the hub;
wherein the compound contoured surface is configured to direct air flow around the compound contoured surface and along roots of the blades.

7. The fan rotor of claim 6, wherein the compound contoured surface further comprises:
a chamfered segment extends from the second arcuate segment and has an angle $A_1$; and
a third arcuate segment extends from the chamfered segment to the radially outer surface and has a third radius $R_3$.

8. The fan rotor of claim 7, wherein:
a ratio of the first radius $R_1$ to the third radius $R_3$ is between 0.1220 and 0.1795; and
a ratio of the second radius $R_2$ to the third radius $R_3$ is between 0.2195 and 0.2821.

9. The fan rotor of claim 7, wherein:
the first radius $R_1$ of the first arcuate segment is between 0.025 inches (0.0635 centimeters) and 0.035 inches (0.0889 centimeters);
the second radius $R_2$ of the second arcuate segment is between 0.045 inches (0.1143 centimeters) and 0.055 inches (0.1397 centimeters); and
the third radius $R_3$ of the third arcuate segment is between 0.195 inches (0.4953 centimeters) and 0.205 inches (0.5207 centimeters).

10. The fan rotor of claim 7, wherein the angle $A_1$ of the chamfered section is between 19.5 degrees and 20.5 degrees.

11. The fan rotor of claim 7, wherein a forward-most point of the compound contoured surface is distance $D_1$ away from a central axis, wherein the chamfered section has a first end at a distance $D_2$ from the forward-most point of the compound contoured surface, and wherein a ratio of $D_2$ to $D_a$ is between 0.0470 and 0.0569.

12. The fan rotor of claim 7, wherein the chamfered section has a first end at a distance $D_3$ from the central axis, wherein the radially outer surface of the upstream arm is distance $D_4$ away from a central axis, and wherein a ratio of distance $D_3$ to distance $D_4$ is between 0.9909 and 0.9970.

13. A ram air fan comprising:
a tie rod with a first end and a second end;
a motor including a rotor that rotates with the tie rod and a stator positioned radially around the rotor; and
a fan rotor attached to the first end of the tie rod that rotates with the tie rod, wherein the fan rotor comprises:
a fan rotor hub with an inner hub portion, a disk portion connected to a radially outer surface of the inner hub portion, and an outer hub portion connected to a radially outer surface of the disk portion, wherein the outer hub portion has an upstream arm with a radially inner surface, a radially outer surface opposite of the radially inner surface, and a compound contoured surface connecting the radially inner surface to the radially outer surface wherein the compound contoured surface comprises:
- a first arcuate segment extends from the radially inner surface of the upstream arm and has a first radius $R_1$;
- a second arcuate segment extends from the first arcuate segment and has a second radius $R_2$;
- a chamfered segment extends from the second arcuate segment and has an angle $A_1$; and
- a third arcuate segment extends from the chamfered segment to the radially outer surface and has a third radius $R_3$;
- wherein a ratio of the second radius $R_2$ to the third radius $R_3$ is between 0.2195 and 0.2821; and blades extending radially outwards from the fan rotor hub;

wherein the compound contoured surface is configured to direct air flow around the compound contoured surface and along roots of the blades.

14. The ram air fan of claim 13, wherein:
a ratio of the first radius $R_1$ to the second radius $R_2$ is between 0.4545 and 0.7778; and
a ratio of the first radius $R_1$ to the third radius $R_3$ is between 0.1220 and 0.1795.

15. The ram air fan of claim 13, wherein:
the first radius $R_1$ of the first arcuate segment is between 0.025 inches (0.0635 centimeters) and 0.035 inches (0.0889 centimeters);
the second radius $R_2$ of the second arcuate segment is between 0.045 inches (0.1143 centimeters) and 0.055 inches (0.1397 centimeters); and
the third radius $R_3$ of the third arcuate segment is between 0.195 inches (0.4953 centimeters) and 0.205 inches (0.5207 centimeters).

16. The ram air fan of claim 13, wherein the angle $A_1$ of the chamfered section is between 19.5 degrees and 20.5 degrees.

17. The ram air fan of claim 13, and further comprising:
- a journal bearing shaft positioned radially around the second end of the tie rod;
- a bearing housing adjacent the second end of the tie rod and positioned around part of the journal bearing shaft;
- a first journal bearing positioned between the journal bearing shaft and the bearing housing;
- a thrust shaft positioned radially around the first end of the tie rod;
- a fan housing adjacent the first end of the tie rod and positioned around part of the thrust shaft;
- a second journal bearing positioned between the fan housing and the thrust shaft;
- a hub positioned radially around the first end of the tie rod; and
- an inlet shroud positioned radially around the first end of the tie rod.

* * * * *